(12) United States Patent
Amirzadeh et al.

(10) Patent No.: US 6,436,183 B1
(45) Date of Patent: Aug. 20, 2002

(54) ZINC SULPHIDE PIGMENT

(75) Inventors: Djamschid Amirzadeh, Moers; Jochen Winkler, Rheurdt, both of (DE)

(73) Assignee: Lurgi AG Abtellung Patente, A-VRP, Frankfurt am Main (DE)

( * ) Notice: Subject to any disclaimer, the term of this patent is extended or adjusted under 35 U.S.C. 154(b) by 0 days.

(21) Appl. No.: 09/254,526

(22) PCT Filed: Aug. 28, 1997

(86) PCT No.: PCT/EP97/04681

§ 371 (c)(1),
(2), (4) Date: Jul. 6, 1999

(87) PCT Pub. No.: WO98/12271

PCT Pub. Date: Mar. 26, 1998

(30) Foreign Application Priority Data

Sep. 20, 1996 (DE) .......................................... 196 38 475

(51) Int. Cl.⁷ ................................................. C09D 1/00
(52) U.S. Cl. ...................... 106/420; 423/566.1; 524/420
(58) Field of Search ...................... 106/420; 423/566.1; 524/420

(56) References Cited

U.S. PATENT DOCUMENTS

| | | | | |
|---|---|---|---|---|
| 3,131,238 A | * | 4/1964 | Carnall et al. ........... | 423/566.1 |
| 3,672,830 A | | 6/1972 | Calbeck | |
| 4,366,141 A | * | 12/1982 | Martin et al. ............. | 423/566.1 |
| 5,498,369 A | * | 3/1996 | Bredol et al. ............. | 423/566.1 |
| 6,096,819 A | * | 8/2000 | Poch-Parramon et al. .. | 524/420 |

FOREIGN PATENT DOCUMENTS

CA 967 708 A 5/1975

* cited by examiner

Primary Examiner—Helene Klemanski
Assistant Examiner—Veronica F. Faison
(74) Attorney, Agent, or Firm—Norris McLaughlin & Marcus

(57) ABSTRACT

Shaped parts made of synthetic organic polymers have a good transparency in the range of visible light, good fire-proofing properties and a good remission from infrared radiation if they contain 1 to 45% by volume transparent zinc sulphide pigment with a mean particle size $d_{50}$ in the range from 1 to 14 $\mu$m.

38 Claims, No Drawings

ZINC SULPHIDE PIGMENT

This application is a 371 of PCT/EP97/04681, which was filed on Aug. 28, 1997.

This invention relates to zinc sulfide pigment for use in shaped parts made of synthetic organic polymers, and in coatings such as lacquers, colors, jointing and sealing compounds with good transparency for the range of visible light, good remission of infrared radiation and good fireproofing properties.

From the company brochure no. 1119596 of Sachtleben Chemie GmbH, Duisburg, a zinc sulfide pigment is known, for whose production highly purified zinc salt and sodium sulfide solutions are used. By annealing at about 700° C., the very finely precipitated zinc sulfide is brought to the narrow particle size distribution with a central value of about 0.3 $\mu$m, which is optimum for the light scattering power. The high remission in the visible and near ultraviolet regions provides a neutral whiteness as well as an optimum efficiency with respect to the scattering and covering power of coatings and an optimum brightening power in plastics. Due to the white pigment properties, the zinc sulfide pigment is used wherever organic or inorganic binders must have a high pigment loading for specific applications, e.g. in undercoat lacquers, jointing and sealing compounds, primers etc. Plastics are likewise pigmented with zinc sulfide, for instance melamine, urea and polyester molding compounds, so that the same can very well be dyed and in addition good fireproofing properties are achieved. The thermal stability of many thermoplastic materials can be influenced favorably by zinc sulfide pigment.

Due to the relatively low Mohs' hardness of 3 and the spherical particle shape, zinc sulfide has a very low abrasiveness and therefore causes no metal abrasion when it is being processed. Zinc sulfide is used as white pigment in plastics on a large scale, because in contrast to zinc sulfide, the titanium dioxide alternatively used as white pigment leads to the breaking of glass fibers due to its higher Mohs' hardness of 5.5 to 6.5.

It is the object of the present invention to provide zinc sulfide pigment for use in shaped parts made of synthetic organic polymers and in coatings such as lacquers, colors, jointing and sealing compounds, which not only should have good fireproofing properties, but also a good remission of infrared radiation and at the same time a good transparency in the range of visible light.

This object is solved by zinc sulfide pigment with a mean particle size $d_{50}$ in the range from 1 to 14 $\mu$m with a narrow particle size distribution, which in an amount of 0.5 to 55 vol-%, preferably 1 to 45 vol-%, based on the finished product, is added to the polymers and is produced in that a compound containing sulfide is brought in contact with an aqueous solution containing a zinc compound, and the precipitated zinc sulfide is annealed for 10 minutes to 4 hours at a temperature of 750 to 1200° C.

By adding 0 to 30 wt-%, preferably 0.5 to 25 wt-% annealing salt, based on the content of zinc sulfide, the rate of growth of the zinc sulfide pigment particles can be accelerated.

Preferred further aspects of the invention include the following: The zinc sulfide pigment may have a mean particle size $d_{50}$ in the range from 1 to 12 $\mu$m. The process may further comprise the addition of 0 to 30 wt-%, preferably 0.5 to 25 wt-% annealing salt, based on the content of zinc sulfide. The process may comprise the use of one or several of the zinc compounds $ZnSO_4$, $ZnCl_2$, ZnO, $Zn(OH)_2$, or $ZnCO_3$. The process may comprise the use of one or more of the sulfide compounds $Na_2S$, $K_2S$, $H_2S$, or $(NH_4)_2S$. The annealing may be conducted in the range from 800 to 1100° C. The annealing treatment may be conducted for 30 minutes to 2.5 hours. The process may further comprise quenching in water subsequent to the annealing treatment and a subsequent acid treatment at a pH value from 2.0 to 4.0. The process may further comprise the use of one or more of the annealing salts alkali, alkaline earth and zinc compounds, such as NaCl, KCl, $ZnCl_2$, $ZnSO_4$, and $MgCl_2$. The process may further comprise a comminuting treatment, preferably grinding. The process may further comprise a hydrothermal treatment of a suspension containing the precipitated zinc sulfide at a pressure from 50 to 100 bar and a temperature in the range from 80 to 250° C. The process may further comprise a treatment of a suspension containing precipitated zinc sulfide by classifying, preferably by hydrocyclone separation. The process may further comprise a classification of comminuted zinc sulfide, preferably by air-flow classification.

For a better processing in the polymers, the zinc sulfide pigment can be subjected to an inorganic or organic after-treatment, as this is for instance also common practice in the known zinc sulfide pigments as well as titanium dioxide pigments mentioned above.

Synthetic organic polymers include all duromers, elastomers and thermoplastic materials, which possibly can also contain processing aids such as stabilizers, plasticizers, organic and inorganic pigments, dyes, glass fibers etc., singly or plurally.

When using the inventive zinc sulfide pigment in shaped parts made of synthetic organic polymers, there may in addition be used one or more of the fireproofing agents aluminium hydroxide, antimony oxide, magnesium hydroxide, halogenated organic compounds, etc.

The advantages achieved by means of the invention in particular consist in that the shaped parts made of synthetic organic polymers and coatings such as lacquers, colors, jointing and sealing compounds by using the inventive zinc sulfide have a high transparency for the light in the visible region as well as a good remission of infrared radiation. The evaluation of the fireproofing properties is identical with those achieved with the comparatively much more fine-grained zinc sulfide pigments described in the prior art.

In accordance with a preferred aspect of the invention there is provided a content of zinc sulfide pigments of 5 to 35 vol-%, based on the finished product. As a result, particularly good fireproofing properties, transparency in the range of the visible light and remission of infrared radiation can be achieved.

The zinc sulfide pigment has a very low scattering power and no inherent color, so that it leads to a low covering power when it is incorporated in the shaped parts and in the coatings. Therefore, the zinc sulfide pigment can be used in combination with color pigments without occurrence of a noticeable brightening.

The invention will subsequently be explained in detail with reference to an embodiment.

Into a receiving flask containing 50 ml distilled water the solutions of $ZnSO_4$ (120 g/l Zn) and $Na_2S$ (60 g/l $Na_2S$) having a temperature of 65° C. are simultaneously added with stirring, where the addition of the two components into the receiving flask is controlled such that the suspension has a pH value of 3 to 4.

Upon precipitation of the zinc sulfide, the pH value of the suspension is adjusted with stirring to a pH value of 7 to 7.5 by further addition of $Na_2S$ solution, and the suspension is then stirred for 15 minutes. Subsequently, the suspension is filtrated, and the filter cake formed is mixed with 6 wt-% NaCl as annealing salt, based on the zinc sulfide content, and upon homogenization in a commercially available mixer is dried in a drying cabinet at 130° C. The intermediate product thus obtained is then annealed in a muffle furnace at a temperature of 900° C. for a period of 2 hours. The annealed product is subsequently quenched in water with stirring, and after stirring for 10 minutes is adjusted to a pH value of 2.5 to 3.5 with 10% sulfuric acid, where the possibly formed zinc oxide and soluble salts are dissolved out. Finally, the suspension is filtrated, washed thoroughly, the filter cake is dried in the drying cabinet at 120 to 150° C. and ground in a pin-type mill until the agglomerates formed are destroyed.

For adjusting a rather narrow particle size distribution, the suspension may be subjected to a hydrocyclone separation or similarly acting known separation processes for separating the fine and coarse particles. It is also possible to subject the grinding material to a classification, e.g. an air-flow classification, for separating the fine and coarse particles.

The zinc sulfide pigment produced in this way has a mean particle size $d_{50}$ of 6 μm and a relative scattering power (Ry) of 5.6.

On the other hand, the known zinc sulfide pigment described above has a mean particle size $d_{50}$ of 0.35 μm and a relative scattering power (Ry) of 55.

The scattering power is the capacity of a pigmented substance to diffusely reflect part of the impinging light. By ascribing the cause for the light scattering of the pigmented substance to the pigment, reference is made to the scattering power of the pigment. The determination of the relative scattering power of white pigments can be effected according to DIN 53165.

For comparison purposes, polyethylene (PE) films having a wall thickness of 50 μm were made by blowing, into which films there were incorporated 5 wt-% of the inventive zinc sulfide pigment with a mean particle size $d_{50}$ of 6 μm and 5 wt-% of the known zinc sulfide pigment with a mean particle size $d_{50}$ of 0.35 μm. For these films there were determined the remission (parameter for transparency), the transmission of infrared radiation for three wavelength ranges by means of an Y-filter (green filter) of a three-range spectrophotometer as well as the fire behavior by means of the Limiting-Oxygen-Index (LOI) according to DIN 22117 E. The test results are represented in the following table.

| Experiment | | Remission (Ry) | Transmission in infrared regions | | | Fireproofing LOI (% O$_2$) |
|---|---|---|---|---|---|---|
| | | | 7–13 μm | 15–25 pm | 32–40 μm | |
| 1.5 wt-% ZnS, $d_{50}$ = 6 μm | in PE | 13.8 | 50–60 | 60 | 55 | 24.5% |
| 2.5 wt-% ZnS, $d_{50}$ = 0.35 μm | in PE | 50.4 | 80–85 | 80 | 80–85 | 24.5% |

A comparison of the test results shows that the polyethylene films, which are pigmented with the inventive zinc sulfide pigment, have a clearly lower remission and accordingly a better transparency as compared to the polyethylene films in which the known zinc sulfide pigment was incorporated. It must be noted that in the polyethylene films with the inventive zinc sulfide pigment the transmission of infrared radiation is also significantly better, whereas the fireproofing properties are not different. Polyethylene films which are not pigmented with the zinc sulfide pigment exhibit a LOI value of 5%.

What is claimed is:

1. A shaped part made of synthetic organic polymers, and having incorporated therein a volume content of 0.5 to 55% of a zinc sulfide pigment, said volume content being based on the total volume of the shaped part, wherein the zinc sulfide pigment has a mean particle size $d_{50}$ in the range from 1 to 14 μm, and is produced by a process comprising contacting a sulfide compound with an aqueous solution containing a zinc compound to precipitate zinc sulfide, drying zinc sulfide, and annealing dried zinc sulfide for 10 minutes to 4 hours at a temperature of 750 to 1200° C.

2. The shaped part according to claim 1, which has incorporated therein a volume content of 1 to 45% of the zinc sulfide pigment based on the total volume of the shaped part.

3. The shaped part according to claim 1, wherein the zinc sulfide pigment has a mean particle size $d_{50}$ in the range from 1 to 12 μm.

4. The shaped part according to claim 1, wherein the process further comprises the addition of 0 to 30 wt-% of an annealing salt, based on the content of zinc sulfide.

5. The shaped part according to claim 4, wherein the process further comprises the addition of 0.5 to 25 wt-% of an annealing salt, based on the content of zinc sulfide.

6. The shaped part according to claim 1, wherein the zinc compound used in the process is one or several members selected from the group consisting of $ZnSO_4$, $ZnCl_2$, ZnO, $Zn(OH)_2$ and $ZnCO_3$.

7. The shaped part according to claim 1, wherein the sulfide compound is one or several members selected from the group consisting of $Na_2S$, $K_2S$, $H_2S$ and $(NH_4)_2S$.

8. The shaped part according to claim 1, wherein the annealing is conducted in the range from 800 to 1100° C.

9. The shaped part according to claim 1, wherein the annealing is conducted for 30 minutes to 2.5 hours.

10. The shaped part according to claim 1, wherein the process further comprises quenching in water subsequent to the annealing and thereafter acid treatment at a pH value from 2.0 to 4.0.

11. The shaped part according to claim 1, wherein the process further comprises the use of one or more annealing salts selected from the group consisting of alkali, alkaline earth and zinc compounds.

12. The shaped part according to claim 11, wherein the annealing salts are selected from the group consisting of NaCl, KCl, $ZnCl_2$, $ZnSO_4$ and $MgCl_2$.

13. The shaped part according to claim 1, wherein the process further comprises a comminuting treatment.

14. The shaped part according to claim 13, wherein the comminuting treatment comprises grinding.

15. The shaped part according claim 1, wherein the process further comprises a hydrothermal treatment of a suspension containing the precipitated zinc sulfide at a pressure from 50 to 100 bar and a temperature in the range from 80 to 250° C.

16. The shaped part according to claim 1, wherein the process further comprises a treatment of a suspension containing precipitated zinc sulfide by classifying.

17. The shaped part according to claim 16, wherein the classifying comprises hydrocyclone separation.

18. The shaped part according to claim 1, wherein the process further comprises a classification of comminuted zinc sulfide.

19. The shaped part according to claim 18, wherein the classification of comminuted zinc sulfide comprises air-flow classification.

20. A coating composition having incorporated therein a volume content of 0.5 to 55% of a zinc sulfide pigment, said volume content being based on the total volume of the coating, wherein the zinc sulfide pigment has a mean particle size $d_{50}$ in the range from 1 to 14 $\mu$m, and is produced by a process comprising contacting a sulfide compound with an aqueous solution containing a zinc compound to precipitate zinc sulfide, drying zinc sulfide, and annealing dried zinc sulfide for 10 minutes to 4 hours at a temperature of 750 to 1200° C.

21. The coating composition according to claim 20, which has incorporated therein a volume content of 1 to 45% of the zinc sulfide pigment based on the total volume of the coating composition.

22. The coating composition according to claim 20, wherein the zinc sulfide pigment has a mean particle size $d_{50}$ in the range from 1 to 12 $\mu$m.

23. The coating composition according to claim 20, wherein the process further comprises the addition of 0 to 30 wt-% of an annealing salt, based on the content of zinc sulfide.

24. The coating composition according to claim 23, wherein the process further comprises the addition of 0.5 to 25 wt-% of an annealing salt, based on the content of zinc sulfide.

25. The coating composition according to claim 20, wherein the zinc compound used in the process is one or several members selected from the group consisting of $ZnSO_4$, $ZnCl_2$, $ZnO$, $Zn(OH)_2$ and $ZnCO_3$.

26. The coating composition according to claim 20, wherein the sulfide compound is one or several members selected from the group consisting of $Na_2S$, $K_2S$, $H_2S$ and $(NH_4)_2S$.

27. The coating composition according to claim 20, wherein the annealing is conducted in the range from 800 to 1100° C.

28. The coating composition according to claim 20, wherein the annealing is conducted for 30 minutes to 2.5 hours.

29. The coating composition according to claim 20, wherein the process further comprises quenching in water subsequent to the annealing and thereafter acid treatment at a pH value from 2.0 to 4.0.

30. The coating composition according to claim 20, wherein the process further comprises the use of one or more annealing salts selected from the group consisting of alkali, alkaline earth and zinc compounds.

31. The coating composition according to claim 30, wherein the annealing salts are selected from the group consisting of NaCl, KCl, $ZnCl_2$, $ZnSO_4$ and $MgCl_2$.

32. The coating composition according to claim 20, wherein the process further comprises a comminuting treatment.

33. The coating composition according to claim 32, in the comminuting treatment comprises grinding.

34. The coating composition according claim 20, wherein the process further comprises a hydrothermal treatment of a suspension containing the precipitated zinc sulfide at a pressure from 50 to 100 bar and a temperature in the range from 80 to 250° C.

35. The coating composition according to claim 20, wherein the process further comprises a treatment of a suspension containing precipitated zinc sulfide by classifying.

36. The coating composition according to claim 35, wherein the classifying comprises hydrocyclone separation.

37. The coating composition according to claim 20, wherein the process further comprises a classification of comminuted zinc sulfide.

38. The coating composition according to claim 37, wherein the classification of comminuted zinc sulfide comprises air-flow classification.

* * * * *